United States Patent [19]

Herse

[11] Patent Number: 4,971,422
[45] Date of Patent: Nov. 20, 1990

[54] MULTIWAY CONNECTOR FOR OPTICAL WAVEGUIDES

[75] Inventor: Klaus Herse, Weil der Stadt, Fed. Rep. of Germany

[73] Assignee: Alcatel N.V., Amsterdam, Netherlands

[21] Appl. No.: 179,516

[22] Filed: Apr. 8, 1988

[30] Foreign Application Priority Data

Apr. 9, 1987 [DE] Fed. Rep. of Germany ....... 3711940

[51] Int. Cl.⁵ .................................................. G02B 6/38
[52] U.S. Cl. ................................ 350/96.21; 350/96.20
[58] Field of Search ............................ 350/96.20, 96.21

[56] References Cited

U.S. PATENT DOCUMENTS

| | | | |
|---|---|---|---|
| 4,142,776 | 3/1979 | Cherin et al. ................... | 350/96.21 |
| 4,629,284 | 12/1986 | Malavielle ....................... | 350/96.21 |
| 4,648,688 | 3/1987 | Ashman et al. .................. | 350/96.20 |
| 4,707,069 | 11/1987 | Hoffman .......................... | 350/96.20 |
| 4,726,647 | 2/1988 | Kakii et al. ...................... | 350/96.20 |

FOREIGN PATENT DOCUMENTS

2742084 3/1978 Fed. Rep. of Germany .

Primary Examiner—William L. Sikes
Assistant Examiner—Robert E. Wise
Attorney, Agent, or Firm—Christie, Parker & Hale

[57] ABSTRACT

A multiway fiber-optic connector is disclosed having two axially connectable support members (6, 7) by which the end faces of the respective optical waveguides are held together, several axial grooves in which the ends of the optical waveguides are received so as to be in alignment, and a guide member (8) into which the two support members (6, 7) are inserted and in which they are guided along two sidewalls of a prism-like interior space. The end of each optical waveguide is mounted in a holding device (42, 43) contained in a recess (48) of the respective support member (6, 7). This recess (48) has an axial guide edge (49) for the holding device (42, 43). The exact positions of the optical waveguides are determined by the distances between the guide edge and two bearing surfaces (50, 51) of the support member (6, 7).

8 Claims, 2 Drawing Sheets

MULTIWAY CONNECTOR FOR OPTICAL WAVEGUIDES

TECHNICAL FIELD

The present invention pertains to a multiway connector for optical waveguides.

BACKGROUND ART

Published German Patent Application No. DE-OS 27 42 084 (which corresponds to Cherin et al issued U.S. Pat. No. 4,142,776) discloses a connector for linear arrays of optical fiber waveguides including two axially connectable support members by which the end faces of the optical waveguides to be interconnected are coupled together, each of the support member being provided with a number of parallel grooves in which the ends of the optical waveguides are respectively seated and a guide member into which the two support members are inserted and in which they are guided along two sidewalls of a prism-shaped chamber.

In a prior-art connector of this kind, the two support members for the optical waveguides and the guide member receiving the latter have an approximately prismatic cross section. Two base surfaces of the guide member, which meet at an included angle alpha, and the two corresponding surfaces of each of the two support members must all be accurately machined to ensure the required precise axial alignment of the individual optical fibers. Between the top cover of the two support members and the upper surface of the guide member, there may be a certain amount of play; in that case, the reference surfaces of the support members and of the guide member are held in contact with one another by means of screws.

It is to be noted that in such a prior art connector design, it is very difficult to consistently machine both pairs of reference surfaces so precisely that the required precise axial alignment of all the optical waveguides to be connected can be achieved. If measurements on the already assembled and mated multiway connector show that the insertion loss is unacceptably high, it is difficult to remachine the entire reference surfaces and in any event such remachining will impair the desired tight fit of the support members in the guide member.

It is also to be noted that in the prior-art connector the force by which the end faces of the two support members are urged against each other depends on various random factors present during mating, including the frictional force between the support members and the guide member. No source of a precisely defined contact pressure is provided to ensure that the ends of the two optical waveguides abut without leaving any air gap between them.

DISCLOSURE OF INVENTION

It is a primary object of the invention to provide a multiway connector for optical waveguides which permits easy connection and disconnection of two optical waveguide bundles and exhibits as low as insertion loss as possible.

In accordance with the more generic aspects of the invention, this object is achieved by a improved connector in which the optical waveguides are mounted in holding devices, each of which is contained in a recess of the respective support member;

this recess has an axial guide edge for the holding device, and the exact positions of the optical waveguides are determined by the distances between the guide edge and two bearing surfaces of the support member.

One advantage of the connector according to the invention is that precise axial (lateral) alignment of the optical waveguides in the two connector halves is ensured by precisely maintaining only two distances. This is achieved by accurately machining a guide edge in the guide member, which can be ground with precision, and a side surface of the optical fiber holding plate, which side can be etched very accurately. Should the attenuation of a connector produced in accordance with the invention prove to be too high, the distances mentioned above can be adjusted more accurately by slightly grinding off the narrow guide surfaces which surround the recess of the respective support member.

Also in the preferred embodiment, a spring pressing laterally on the support members ensures that the latter rest against the two interior sidewalls of the guide member in a perfect and reproducible position and a spring pressing axially against one of the support members ensures a precisely defined contact pressure between the two support members when the connector halves are mated.

BRIEF DESCRIPTION OF DRAWINGS

Embodiments of the invention will now be explained with reference to the accompanying drawings, in which.

BEST MODE FOR CARRYING OUT THE INVENTION

Figure 1:
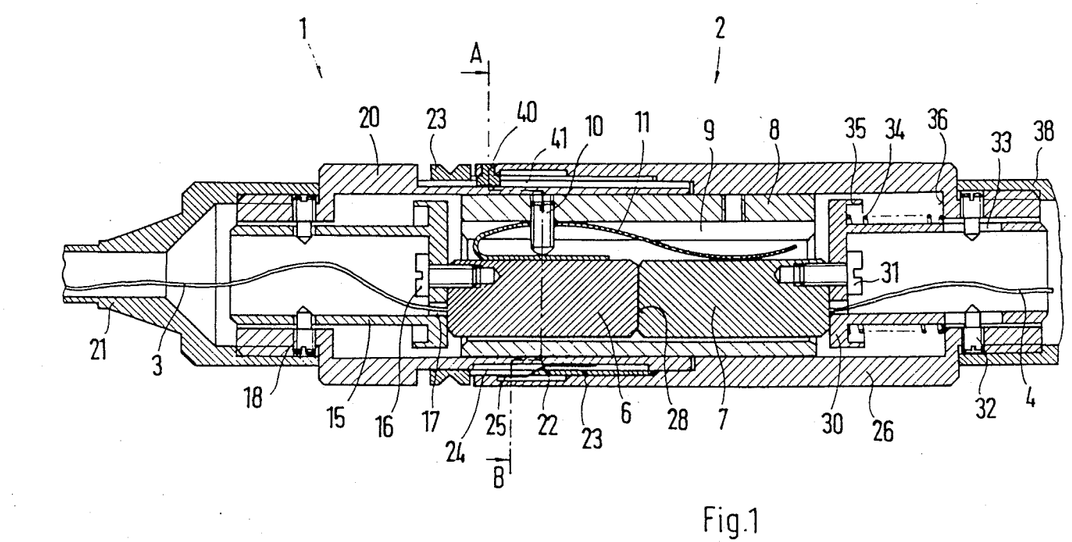
FIG. 1 is a longitudinal section of a multiway connector for optical waveguides in accordance with the invention.

A multiway connector in accordance with the invention (FIGS. 1 to 4) consists of two matable halves, a first half 1—in the drawing the left half—and a second half 2—in the drawing the right half—, which are shown in the mated condition (FIG. 1). By this connector, two bundles of optical waveguides are optically coupled together. Each bundle consists, for example, of 10 individual optical fibers, of which only one left optical fiber 3 and one right optical fiber 4 are shown.

The two connector halves 1 and 2 are not of identical design, but they contain two identical support members 6 and 7. These support members serve to receive and guide holding devices which receive the optical fibers, as will be explained with reference to the other figures.

Figure 2:
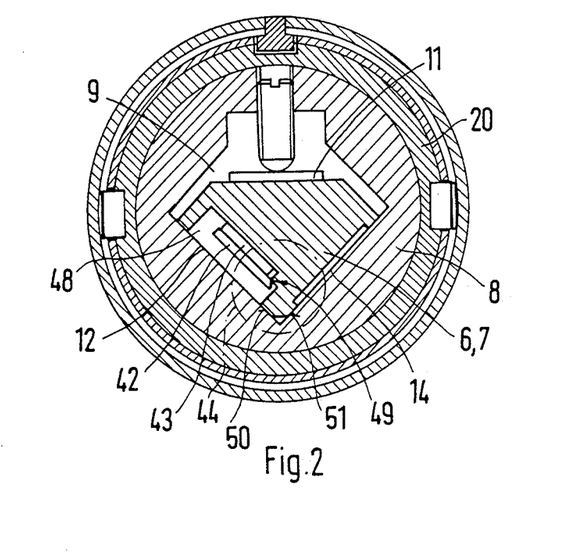
FIG. 2 is a cross section of the connector of FIG. 1.

Each of the support members 6, 7 has the shape of a prism of approximately triangular cross section (cf. FIG. 2). They are surrounded by a cylindrical guide member 8 which has a prism-like interior space 9 corresponding to the shape of the support members 6, 7. The guide member 8 is permanently connected with the left support member 6 by a stud bolt 10. The latter also serves to fasten a flat spring 11 whose left, bent-back end portion is clamped between the support member 6 and the guide member 8. In its upper leg, the spring has a hole through which the stud bolt 10 is passed. The right end portion of the flat spring 11 is bent so that, when the connector halves are being mated, the right support member 7 can be inserted and is urged downwards by the spring 11. When the connector halves are mated, the flat spring 11 presses the two support members 6, 7 down and, thus, against two inside walls 12, 14 of the guide member 8, which constitute the reference surfaces for the exact position of the support members 6, 7, and, thus, for the optical fibers to be connected.

A plastic circular member 15, which is concentric with the axis of the connector, is fastened to the support member 6 by a screw 16. This circular member 15 provides a space for the optical fibers 3 passing through a ring-sector-shaped opening 17. The circular member 15 is connected to a left external sleeve 20 by two threaded pins 18 so that it can neither be moved axially nor rotated, apart from a slight tolerance play. Screwed onto the external sleeve 20 is a plastic cap 21 which covers the two threaded pins 18 and serves to protect the optical fibers from buckling. Since the support member 6 is connected with the circular member 15 by the screw 16, and the circular member 15 is connected with the external sleeve 20 by the threaded pins 18, while the support member 6 is connected with the guide member 8 by the stud bolt 10, all parts mentioned form the left half 1 of the connector. Attached to the outside of the external sleeve 20 are two strip-shaped locking springs 22 which are bent twice and which interlock the two connector halves 1 and 2 in the mated condition. An unlocking sleeve 23 has axially parallel recesses 24 through which the locking springs 22 extend in the mated condition of the connector halves 1, 2 and engage a recess 25 in a second, right external sleeve 26, this recess being formed by relief turning. The locking springs thus prevent the left external sleeve 20 from being removed from the right external sleeve 26, which surrounds the left external sleeve 20 over part of its length.

Since about half of the length of the guide member 8 extends beyond the left support member 6, the end face 28 of the latter, which is polished and thus very sensitive, is effectively protected against contact and, thus, against contamination and damage.

The right connector half 2 also has a circular member 30 which is connected with the right support member 7 by a screw 31. The circular member 30 is axially movable in relation to the external sleeve 26, since two threaded pins 32 screwed into the external sleeve project into oblong holes 33 provided in the circular member 30. On the outside of the circular member 30 is a compression spring 34, a collar 35 of the circular member 30 and an annular inside surface 36 of a step of the external sleeve 26 acting as stop surfaces at either end of the compression spring. With a constant, precisely defined contact pressure, the compression spring 34 presses the left end face of the support member 7 against the end face 28 of the support member 6. The oblong holes 33 are so designed that any manufacturing tolerances of the individual parts of the connector in the axial direction do not prevent the support members 6, 7 from pressing resiliently against each other.

A plastic cap 38, which also serves as a strain relief and prevents the optical fibers 4 from buckling, is screwed onto the right end portion of the external sleeve 26, thus covering the threaded pins 32.

In the area of the left-hand side opening of the external sleeve 26 is a rivet 40, which, together with an axial groove 41 at the outer circumference of the external sleeve 20, serves as a guide when the connector halves are being mated, and which is pressed into the external sleeve from inside. The connector halves 1, 2 can be mated in only one position relative to each other.

Since the two external sleeves 20 and 26 are slipped one over the other during mating, the right external sleeve 26 extends far beyond the polished end face of the support member 7. As a result, even if the connector halves are separated, this end face is effectively protected against contact and, thus, against damage and contamination.

Figure 3:
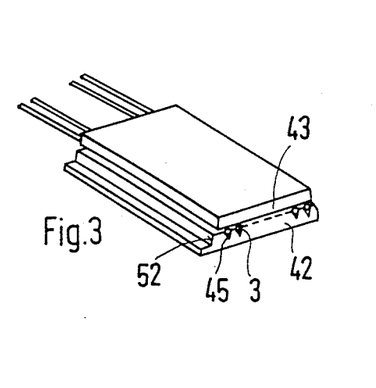
FIG. 3 is a perspective view of the holding device for several optical waveguides which is used in the connector of FIG. 1.
Figure 4:
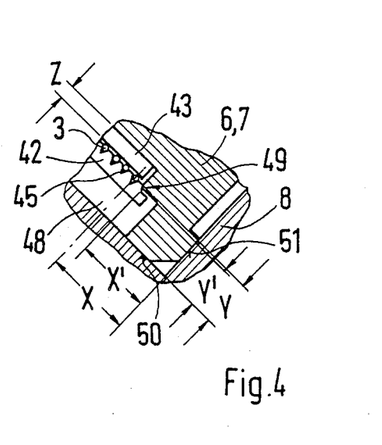
FIG. 4 shows an enlarged detail of FIG. 2.

In each of the two connector halves, several—e.g., ten—optical fibers 3 or 4 of an optical waveguide bundle are mounted in a holding device which consists of a base plate 42 and a cover plate 43 (FIGS. 2, 3, and 4). FIG. 3 is a perspective view of this holding device 42, 43, whereas FIG. 4 shows the area indicated by a circle 44 in FIG. 2 on an enlarged scale.

The base plate 42 is a single-crystal silicon plate into which V-shaped, precisely parallel grooves 45 of equal depth are etched at exactly equal intervals (280 $\mu$m in the present embodiment). After the primary coating has been removed, the suitably ordered optical fibers 3 are placed into these grooves 45. By a suitable device (not shown), the fibers 3 are held down in the grooves 45, while the cover plate 43, which is also a single-crystal, bilaterally smooth silicon plate, is placed on the fiber 3 and pressed down. In this manner, each of the ten fibers 3 is enclosed on three sides and precisely positioned relative to the others. A deviation from the exact spacing of the core centers of the optical fibers 3 will essentially result only from the diameter tolerance of the optical fibers 3. If the outside diameter is 125 $\mu$m, the tolerance will be $\pm 3$ $\mu$m. The spaces between the optical fibers 3, the grooved base plate 42, and the smooth cover plate 43 are filled with a precisely measured quantity of a two-component epoxy-resin adhesive which is drawn in by capillary action and then cured.

The holding device 42, 43 thus obtained is then fixed by adhesive bonding in the support member 6 or 7. To this end, the support members 6, 7 have a longitudinal recess 48 which receives the holding device 42, 43 and which has an edge 49 ground precisely in the longitudinal direction. The distances of this edge 49 from two longitudinal bearing surfaces 50 and 51 of the support members 6 or 7 are designated X' and Y' in FIG. 4. The edge 49 serves as a guide for a side surface 52 of the base plate 42 (cf. FIG. 3), which surface is etched very precisely. Together with the grooves 45, this side is etched out of the silicon crystal with the aid of an etch mask produced with very high precision. The angle of inclination of the side surface 52 and the V-shaped grooves 45 follows from the preferred direction of the silicon crystal.

To attach the holding device in the support member, the smooth surface of the cover plate 43 is wetted with adhesive and the complete holding device 42, 43 is moved on the support member 6 or 7 until it rests against the guide edge 49. The holding device is then fixed in position and the adhesive cured.

If the V-shaped grooves 45 in the base plates 42 of the two connector halves are etched in precisely the same manner and if the two cover plates 43 have the same thickness Z (cf. FIG. 4), only a minor difference, which depends on the diameter of the optical fibers, is added to the tolerance of the distances X' and Y'. The perpendicular distances of the fiber core of the first optical fiber 3 in the holding device 42, 43 from the bearing surfaces 50 and 51 of the support member 6 or 7 are designated X and Y in FIG. 4. If identical parts are used to produce the two holding devices 42, 43, the total tolerance of these distances X and Y is practically no greater than the tolerance of the distances X' and Y'. Thus, the more precisely the guide edge 49 is ground from the support member 6, 7, the less the specified distances X and Y have to be remachined after the holding device 42, 43 has been glued to the support member 6, 7. If, for example, the tolerance of the distances X and Y is ±2.5 μm, an additional loss of about 0.7 dB is caused by the lateral displacement of the optical fibers. If this additional loss is too high, it is readily possible to adjust the distances X and/or Y more precisely by face grinding the bearing surfaces 50, 51 of the support member 6, 7 by hand. The edge 49 ensures that the axes of the optical fibers are in alignment with the direction of insertion of the support members 6, 7.

After both the holding device 42, 43 and the respective support member 6 or 7 have been glued together, their end faces are ground, lapped and polished. Only then will the distances X and Y be precisely adjusted, if necessary, by face grinding, since the distance between the optical fiber center and the two bearing surfaces 50, 51 of the support members 6 and 7 can be measured with precision only if the end faces of the holding device and the glass fibers are polished. The optical fiber center can be detected precisely under a microscope with the help of the dip in the refractive index in the fiber center.

The two ends of the optical waveguides are interconnected as follows. The connector halves 1 and 2 are slipped one over the other in such a manner that the rivet 40 of the right external sleeve 26 moves into engagement with the axial groove 41 of the left external sleeve 20, thus precentering the optical fibers 3 and 4 in a defined manner. As the two connector halves 1 and 2 continue to pass one into the other, the support member 7 of the right connector half 2 is grasped by the flat spring 11 and pressed into the grooved bottom of the guide member 8. The two lower sidewalls 12, 14 of the guide member 8 make an angle of 90° with each other. The optical axes of the optical fibers 3 and 4 in the support members 6 and 7, respectively, then are flush on one line. Next, the support member 7 is inserted into the guide member 8 until the two locking springs 22, which are located on opposite sides and permanently fixed to the external sleeve 20, are in engagement with the recess 25 of the external sleeve 26.

The individual parts of the multiway connector are so designed that if the compression spring 34 is slightly compressed, it urges the end faces 28 against the polished optical fiber ends of both support members 6, 7 in a slightly resilient manner. At the same time, the flat spring 11 presses the support members 6, 7 into the guide member 8. The spring forces of the flat spring 11 and the compression spring 34 are matched. Optical and mechanical coupling of the optical fiber bundles and the connector halves has thus been achieved.

To separate the two connector halves, the thumbnail is inserted into the annular groove of the unlocking sleeve 23 to move the latter towards the external sleeve 20 with slight pressure. The edges of the two recesses 24 of the unlocking sleeve 23, through which recesses the locking springs 22 extend, then press on the inclined surfaces of the locking springs 22, thus pressing them out of the recess 25 of the external sleeve 26. The compression spring 34 can then unload until the threaded pins 32 screwed into the external sleeve 26 strike against the right-hand end of the oblong holes 33 in the circular member 30. Both connector halves are then mechanically unlocked. They are optically decoupled only if both connector halves 1, 2 are separated from each other.

Figure 5:
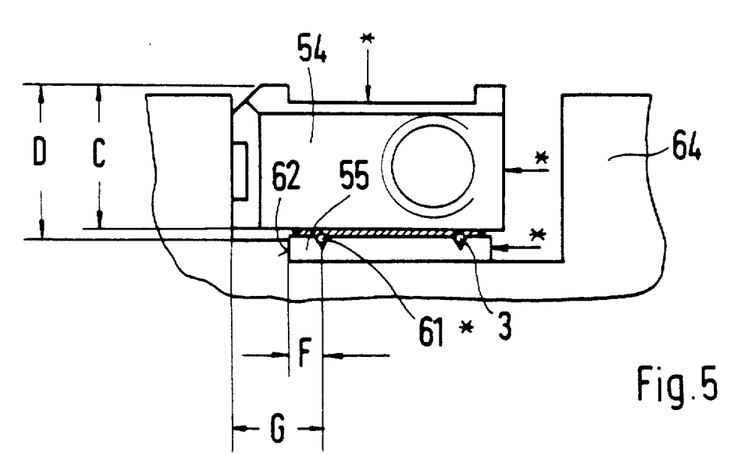
FIG. 5 shows a support member of another embodiment of a multiway connector in accordance with the invention in an assembly device.
Figure 6:
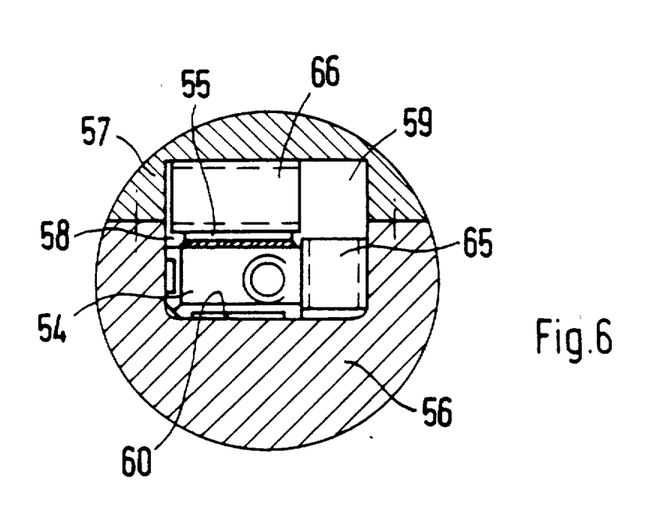
FIG. 6 is a cross section of a multiway connector containing support members as shown in FIG. 5.

The multiway connector which will now be described with reference to FIGS. 5 and 6 is easier to manufacture than the one described above. It contains two support members 54—only one is shown in the drawing—which have an essentially rectangular cross section. In this case, the holding device for the optical fibers is merely a base plate 55 which receives the optical fibers and is glued directly to the support member 54. Each guide member for the support members 54 consists of a bottom part 56 and a top part 57. The bottom part 56 has an interior space 58 which has the shape of a rectangular prism. The top part 57 has a correspondingly shaped interior space 59.

Since a cover plate is no longer present, a distance C (FIG. 5) has only to be prefabricated in the case of the support member 54. A distance D consists of the distance C plus half the fiber diameter, thus constituting the perpendicular distance between the fiber center and a guide surface 60 of the bottom part 56 of the guide member. A distance F between the tip of the bottom of a first Y-shaped groove 61 in the base plate 55 and its etched lateral guide surface 62 is also to be prefabricated in a precise manner. In order to provide several support members 54 with base plates 55 for receiving optical fibers, identically prefabricated base plates 55 made of silicon and provided with grooves, optical fibers 3, and support members 54 are placed into a suitably designed auxiliary tool 64. Forces acting from the side and from above, which are indicated by asterisks in the drawing, cause the inserted parts, i.e., the support member 54 and the base plate 55, to be always positioned exactly in the corner. In the auxiliary tool 64, the parts are also glued together. In the support members manufactured one after the other in this manner, the distances G between the first V-shaped groove 61 and the left bearing surface of the support members 54 and the distances D between the fiber center and the upper bearing surface of the support members 54 practically do not differ. If necessary, they can be corrected by subsequent fine grinding.

After the support member 54 has been glued together with the optical fibers and the base plate 55, it is inserted into the rectangular interior space 58 of the bottom part 56 of the guide member, the interior space being formed by grinding. After flat springs 65 and 66 have been inserted, the top part 57 is put on and firmly joined to the bottom part 56. The flat springs 65 and 66 cause the support member 54 to be precisely positioned in the interior space of the guide member 56.

To manufacture the connector in accordance with FIGS. 1 to 4, the connector halves are preferably made in pairs, in exact alignment with each other, while in the case of the connectors in accordance with FIGS. 5 and 6, several interchangeable connector halves are preferably manufactured.

We claim:
1. A multiple connector for a multi-strand optical fiber waveguide comprising:

two planar-shaped holding members respectively for holding the two opposing end portions of the optical waveguide to be coupled together, a first planar surface of each of the holding members defining a plurality of grooves for respectively receiving a corresponding plurality of individual strands of the waveguide in a predetermined planar configuration;

two axially connectable support members each defining a pair of bearing surfaces and a planar recess having a predetermined orientation with respect to said bearing surfaces for receiving a respective one of the two holding members said first planar surface of the holding member parallel to a bottom surface of said recess, each said recess including a guide edge defining a lateral position and an axial direction;

a common guide member comprising a pair of sidewalls defining a prism-like cavity into which the two support members are inserted with said bearing surfaces in contact with respective ones of said sidewalls and guided in a predetermined orientation with respect to each other with said axial direction parallel to the longitudinal axis of said prism-like cavity whereby, when an edge of each said holding member is in contact with a corresponding said guide edge, the relative lateral orientation of the optical waveguides relative to each other and to said common guide member is determined by the respective distances between each of the guide edges and at least one of the two bearing surfaces of its support member.

2. A connector as claimed in claim 1, further comprising a spring which urges the bearing members of the two support members against the two sidewalls of the prism-like interior space.

3. A connector as claimed in claim 1, further comprising a spring which urges the two support members against each other in said longitudinal direction.

4. A connector as claimed in claim 1, wherein each said holding member comprises a base plate into which V-shaped, parallel grooves of equal depth are etched at exactly equal intervals.

5. A connector as claimed in claim 4, wherein each said holding member further comprises a plane-parallel, bilaterally smooth cover plate which presses the individual strands of the optical waveguides into said V-shaped grooves, a first planar surface of said cover plate being attached to the optical waveguide and to the base plate by adhesive bonding and the other planar surface parallel thereto being in contact with the bottom surface of said recess.

6. A connector as claimed in claim 5, wherein one of the two support members is fixed to the guide member and the latter projects beyond an interior end face of said one support member.

7. A connector as claimed in claim 6, further comprising an external sleeve which projects beyond the end face of the other of said support members, whereby each of the two end faces is protected when the connect is disconnected.

8. A method for attaching a plurality of strands at respective predetermined lateral positions relative to a reference surface of a support member comprising the steps:

providing an upper planar surface of a plane parallel holding member with a parallel series of grooves at predetermined positions relative to an edge surface;

placing the respective individual said strands in respective ones of said grooves;

using an auxiliary tool having a bottom guide surface for supporting a lower planar surface of said holding member with an edge surface of said holding member in contact with an guide edge of said auxiliary tool, said auxiliary tool also having a lateral guide surface;

placing said support member in said auxiliary tool with a first reference surface in contact with said strands and said holding member and with a second reference surface in contact with said lateral guide surface; and adhesively securing said strands, said holding member and said support member to one another while, using said auxiliary tool jig fixture, applying lateral forces to said support member and said holding member to maintain said edge surface in contact with said guide edge and said second reference surface in contact with said lateral guide surface, and a downward force to said support member to maintain said strands in contact with said first reference surface and said holding member.

* * * * *

UNITED STATES PATENT AND TRADEMARK OFFICE
CERTIFICATE OF CORRECTION

PATENT NO. : 4,971,422

DATED : November 20, 1990

INVENTOR(S) : Klaus Herse

It is certified that error appears in the above-identified patent and that said Letters Patent is hereby corrected as shown below:

The title page should be deleted to appear as per attached title page.

The sheet of Drawing consisting of Figure 5 and 6 should be added as shown on the attached page.

Signed and Sealed this

Eleventh Day of August, 1992

Attest:

DOUGLAS B. COMER

*Attesting Officer*  *Acting Commissioner of Patents and Trademarks*

United States Patent [19]

Herse

[11] Patent Number: 4,971,422
[45] Date of Patent: Nov. 20, 1990

[54] MULTIWAY CONNECTOR FOR OPTICAL WAVEGUIDES

[75] Inventor: Klaus Herse, Weil der Stadt, Fed. Rep. of Germany

[73] Assignee: Alcatel N.V., Amsterdam, Netherlands

[21] Appl. No.: 179,516

[22] Filed: Apr. 8, 1988

[30] Foreign Application Priority Data

Apr. 9, 1987 [DE] Fed. Rep. of Germany ....... 3711940

[51] Int. Cl.$^5$ .................................................. G02B 6/38
[52] U.S. Cl. .................................. 350/96.21; 350/96.20
[58] Field of Search .......................... 350/96.20, 96.21

[56] References Cited

U.S. PATENT DOCUMENTS

| | | | |
|---|---|---|---|
| 4,142,776 | 3/1979 | Cherin et al. | 350/96.21 |
| 4,629,284 | 12/1986 | Malavieille | 350/96.21 |
| 4,648,688 | 3/1987 | Ashman et al. | 350/96.20 |
| 4,707,069 | 11/1987 | Hoffman | 350/96.20 |
| 4,726,647 | 2/1988 | Kakii et al. | 350/96.20 |

FOREIGN PATENT DOCUMENTS

2742084 3/1978 Fed. Rep. of Germany.

Primary Examiner—William L. Sikes
Assistant Examiner—Robert E. Wise
Attorney, Agent, or Firm—Christie, Parker & Hale

[57] ABSTRACT

A multiway fiber-optic connector is disclosed having two axially connectable support members (6, 7) by which the end faces of the respective optical waveguides are held together, several axial grooves in which the ends of the optical waveguides are received so as to be in alignment, and a guide member (8) into which the two support members (6, 7) are inserted and in which they are guided along two sidewalls of a prism-like interior space. The end of each optical waveguide is mounted in a holding device (42, 43) contained in a recess (48) of the respective support member (6, 7). This recess (48) has an axial guide edge (49) for the holding device (42, 43). The exact positions of the optical waveguides are determined by the distances between the guide edge and two bearing surfaces (50, 51) of the support member (6, 7).

8 Claims 3 Drawing Sheets

UNITED STATES PATENT AND TRADEMARK OFFICE
CERTIFICATE OF CORRECTION

PATENT NO. : 4,971,422

DATED : November 20, 1990

INVENTOR(S) : Klaus Herse

It is certified that error appears in the above-identified patent and that said Letters Patent is hereby corrected as shown below:

Column 1, line 17, change "member" to -- members --.

Column 6, line 31, change "Y-shaped" to -- V-shaped --.

Fig.5

Fig.6